United States Patent [19]

Lirette

[11] Patent Number: 4,587,757
[45] Date of Patent: May 13, 1986

[54] FISHING DEVICE

[76] Inventor: Hewitt P. Lirette, Rte. 2, Box 678, Chauvin, La. 70344

[21] Appl. No.: 664,531

[22] Filed: Oct. 25, 1984

[51] Int. Cl.$^4$ ............................................. A01K 97/00
[52] U.S. Cl. ......................................... 43/21.2; 43/11
[58] Field of Search .................. 43/7, 10, 11, 12, 21.2; 224/920, 921, 922

[56] References Cited

U.S. PATENT DOCUMENTS

| | | | |
|---|---|---|---|
| 2,212,756 | 8/1940 | Stewart | 43/11 |
| 2,576,624 | 11/1951 | Miller | 43/21.2 |
| 2,817,472 | 12/1957 | Parkhurst | 224/922 |
| 3,874,573 | 4/1975 | Fruscella et al. | 43/21.2 |

Primary Examiner—Nicholas P. Godici
Assistant Examiner—M. Jordan
Attorney, Agent, or Firm—George A. Bode

[57] ABSTRACT

A fishing device particularly useful for surf fishing and boat fishing adapted to be fastened to the waist of the fisherman. A base plate is provided in a generally arcuate shape to conform to the curvature of the waist area of the wearer. Slots in the base plate allow passage of a belt therethrough for securing the base plate to the waist of the fisherman. A bracket positioned near the center of the base plate has a socket rotatably mounted therein for receiving and supporting a fishing rod. Flexible rings fastened at each end of the base plate serve to receive and retain bait containers. The base plate is also provided with an aperture adjacent at least one lower corner thereof for attaching a fish stringer thereto. A modified dip net has two longitudinal end supports which are received by tubular members fastened on the base plate to position the dip net in a substantially horizontal position. The horizontal positioning of the dip net allows hands off use of the dip net for netting a fish by the wearer simply bending at the waist to cause deflection of the dip net toward the water.

17 Claims, 3 Drawing Figures

FISHING DEVICE

BACKGROUND OF THE INVENTION

1. Field of the Invention

The invention generally relates to a belt attachment and more particularly to a belt attachment for use by fishermen adapted to support a variety of articles

2. General Background

When fishing, it is often necessary that the fisherman have both hands free for operations such as baiting a hook, removing a fish from the hook or changing lures. In these situations, it is necessary that the fisherman be able to place the fishing rod on a stable support which positions the line and hook within easy reach, prevents damage to the rod and reel, and minimizes any safety hazards from the rod and reel to the fisherman and surrounding persons. When fishing from a boat, and especially surf fishing, this is very difficult to do while leaving both hands completely free. It is also very helpful to have a single means for holding a fishing rod, dip net, fish stringer, and bait containers. Patents in this area which applicant is aware of include the following:

U.S. Pat. No. 2,709,544, entitled "Rod And Reel Holder", issued to W. V. Barringer, discloses a fishing device intended primarily for use by persons having only one arm. A horizontally disposed substantially U-shaped frame is positioned at the waist of the wearer and supported by a shoulder engaging harness. A tubular socket is positioned on the side of the frame and adapted to receive the handle of a fishing rod to allow onehanded use thereof.

U.S. Pat. No. 3,917,134, entitled "Personal Fishing Carrier", issued to Tumlinson, discloses a generaly arcuate tray worn about the waist of the fisherman and secured by an adjustable belt. The tray provides upward opening compartments with hinged covers, a fishing rod socket, a drink holder and a flashlight holder.

U.S. Pat. No. 3,556,365, entitled "Spinning Reel Transfer", issued to Bull, discloses a mechanism in which a mechanical holder for a spinning reel is made of a cylindrical element supported on a frame shaped to fit the contour of one's body and attached to a belt for being buckled around the body. The spinning reel may be placed on the mechanical holder to leave the rod free in one hand to facilitate casting in the manner of a fly rod.

U.S. Pat. No. 3,874,573, entitled "Fishing Rod Holster", issued to Fruscella et al., discloses a one-piece fishing rod holster formed from a substantially flat base plate having integral belt attaching means on the upper portion. Upwardly opening loops integral with the base plate extend outwardly therefrom for receiving a fishing rod handle.

U.S. Pat. No. 2,817,472, entitled "Belt With Compartments", issued to Parkhurst, discloses a belt worn around the waist of a fisherman provided with a plurality of compartments for storing articles and a plurality of supporting grommets for supporting other articles therefrom.

U.S. Pat. No. 4,081,115, entitled "Fishing Rod Support Belt", issued to White et al., discloses a support belt for engaging the handle end of a fishing rod. The support belt engages around the waist of the wearer and is provided with a coupler for receiving and restraining therein the handle end of a fishing rod.

U.S. Pat. No. 3,610,622, entitled "Hip-Toss Ball Game", issued to Haroski, discloses a belt supported game piece. The ends of supporting rods are turned downwardly and received by loops or sockets in the belt portion for supporting the extended rods and game basket.

None of the above patents provide a relatively small fishing device attachable to the belt of the wearer which is capable of rotatably supporting a fishing rod, holding bait containers and fish stringers, and supporting a dip net in a position which allows hands off use of the dip net by the fisherman.

SUMMARY OF THE PRESENT INVENTION

The present invention solves the aforementioned problems in a simple and straightforward manner. A fishing device particularly useful for surf fishing and boat fishing is adapted to be fastened to the waist of the fisherman. The base plate is provided in a generally arcuate shape to conform to the curvature of the waist area of the wearer. Slots in the base plate allow passage of a belt therethrough for securing to the waist of the fisherman. The outer side of the base plate is provided with a variety of fittings to aid the fisherman.

A bracket positioned substantially near the center of the plate has a tubular member adapted to receive the handle end of a fishing rod in a socket for resting the rod therein so that the fisherman may have both hands free for baiting lines and unhooking fish. Rings fastened at each end of the plate serve to retain bait containers. The plate is also provided with means at the lower corners for attaching fish stringers thereto. A dip net is provided which is adapted to engage with the base plate in such a manner so as to allow hands free use of the net simply by bending at the waist in addition to conventional hand held use of the net.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
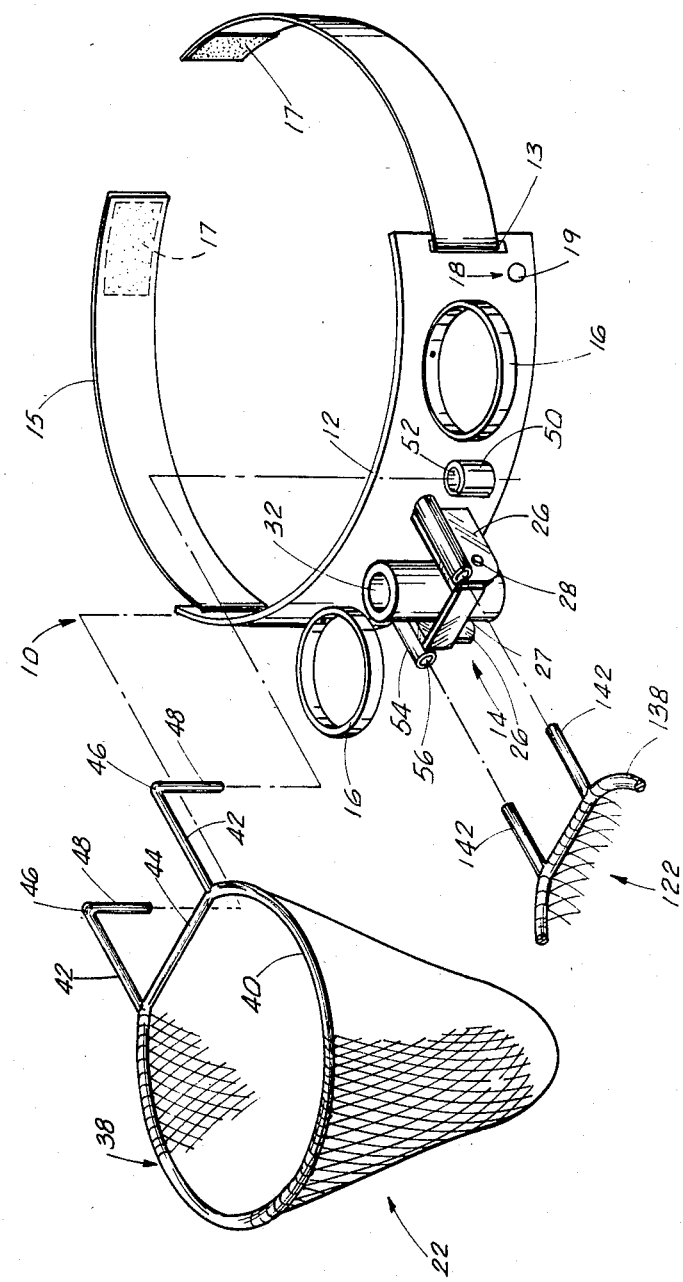
FIG. 1 is a perspective view of the invention.

Referring now to the drawings, it can be seen that the apparatus is generally referred to by the numeral 10. Apparatus 10 is generally comprised of plate 12, means 14 for receiving and holding a fishing rod 11, rings 16 for holding bait containers, means 18 for attaching fish stringers to apparatus 10, dip net 22, and means 24 positioned on plate 12 for receiving and retaining dip net 22 on plate 12.

Figure 2:
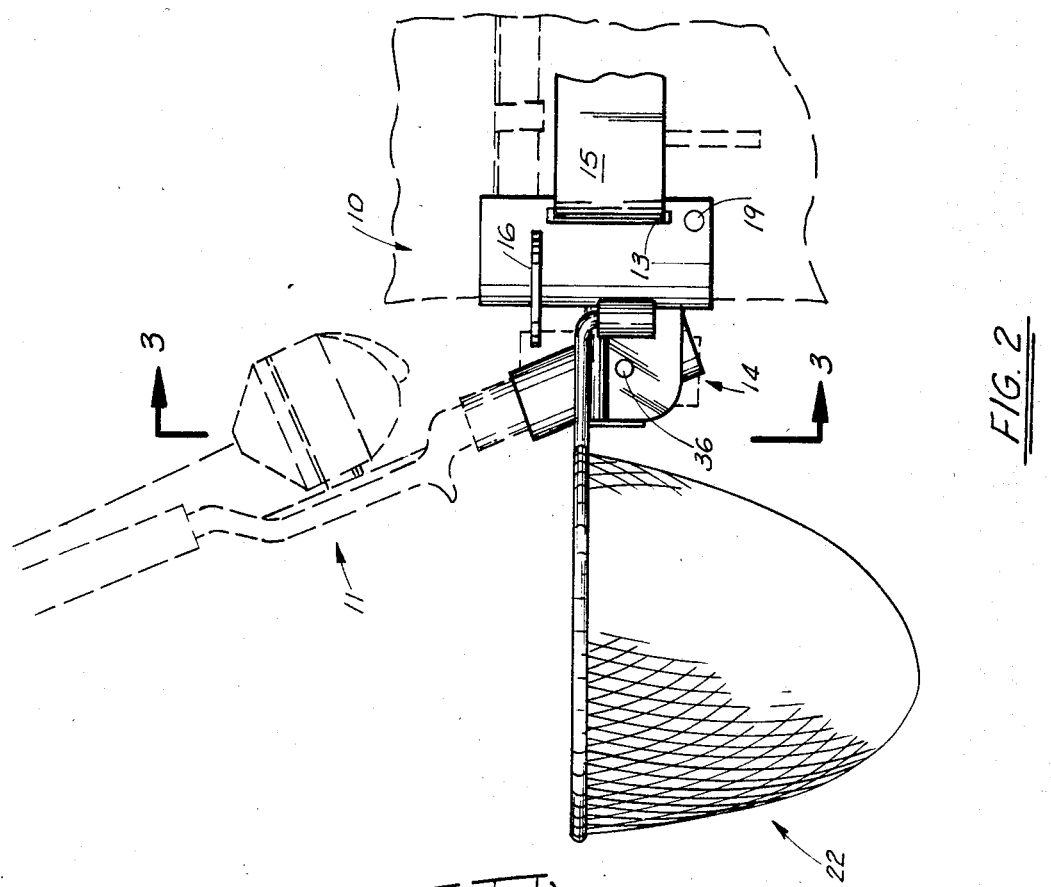
FIG. 2 is a side view of the invention.

Plate 12, as seen in FIGS. 1 and 2, is of a generally arcuate shape so as to conform to the curvature of the waist area of the fisherman and provide greater comfort during use of apparatus 10. Plate 12 may be constructed from any suitable rigid material such as metal or fiberglass but is preferably constructed of aluminum as it is lightweight, strong, and resistant to corrosion. The preferable dimensions of plate 12 are 15 inches in length, 10 inches in width and a thickness of ⅛ inch when constructed of aluminum. A means of attaching apparatus 10 to the waist of the fisherman is provided by vertically aligned slots 13 adjacent each end of plate 12. Slots 13 are preferably 3 inches long and ⅛ inch wide so that a large variety of belts are capable of fitting through slots 13 for attaching apparatus 10 to the waist of the wearer. Belt 15 illustrated in FIG. 1 is provided with velcro fasteners 17 for ease of attachment and removal.

Means 14 for receiving and holding a fishing rod 11 positions rod 11 so that the fisherman has both hands free and the fishing line is within easy reach for baiting hooks, changing lures or unhooking fish. Means 14 is comprised of a substantially U-shaped bracket formed by projecting ribs 26 which extend outwardly from plate 12 and substantially perpendicular thereto. Ribs 26 are preferbly 2 inches wide and 3 inches long, extend from plate 12 substantially parallel to each other, and are rigidly attached to plate 12. Ribs 26 are each provided with an aperture 28 substantially at the center thereof. Sleeve 30 has an axial bore 32 therethrough which serves as a socket for receiving the handle end of fishing rod 11. Sleeve 30 is provided with a radial bore not shown near its lower end for rotatably mounting sleeve 30 on bolt 36 between projecting ribs 26. Threaded bolt 36 is secured in position through the apertures in ribs 26 and sleeve 30 to rotatably fasten sleeve 30 upwardly and at angle away from the wearer between ribs 26 by a nut threadably engaged on bolt 36. In this manner, bolt 36 also serves as a stop to prevent the handle end of fishing rod 11 from sliding completely through sleeve 30. Sleeve 30 is preferably 5 inches long with walls which are ⅛ inch thick. This provides sufficient strength and for properly supporting fishing rod 11 and preventing the rod from slipping out of sleeve 30. It can be seen in FIG. 2 that the portion of sleeve 30 below the point where bolt 36 extends therethrough makes contact with plate 12 upon forward rotation of the upper part of sleeve 30. This angle of rotation is limited to approximately 30 degrees beyond the vertical and serves to prevent excess forward rotation of sleeve 30 which could result in sliding of fishing rod 11 out of sleeve 30. The rearward rotation of sleeve 30 is limited to a position of approximately 90° or only slightly past 90° toward the fisherman due to contact of the upper portion of sleeve 30 with plate 12. Ribs 26 and sleeve 30 are preferably constructed of aluminum. Ribs 26 may be attached to plate 12 by any suitable method but a rigid attachment such as welding is preferred. Plate 27 is rigidly attached to the ends of ribs 26 and serves to provide support thereto as well as limit the rotation of sleeve 30.

Figure 3:
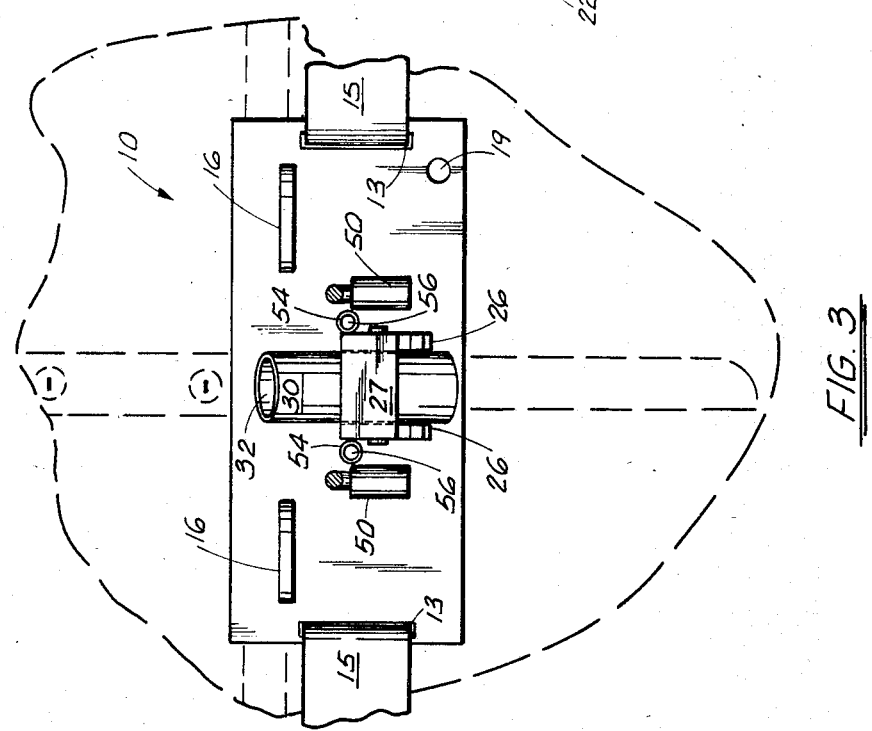
FIG. 3 is a view of the invention taken along the lines 3—3 of FIG. 2.

Rings 16, best seen in FIGS. 1 and 3, are provided on each end of plate 12 and may be attached by any suitable method such as riveting or bolting. Rings 16 are preferably constructed of a flexible material to prevent breakage. Rings 16 are sized to receive and retain disposable bait containers such as those normally obtained in bait and tackle shops which taper downwardly from a wide mouth to a slightly narrower bottom. In this manner, the bait containers are caused to fit snugly within rings 16 and prevent accidental dropping or loss of the containers.

Means 18 for attaching fish stringers to plate 12 may be comprised of any suitable means such as supporting grommets attached to plate 12. In the preferred embodiment, means 18 is comprised of an aperture 19 provided at one or both lower corners of plate 12. This provides for easy attachment and detachment of the snap hook normally provided on fish stringers.

Dip net 22 is provided with a supporting frame 38 which is modified over that of a conventional hand held dip net. As seen in FIG. 1, frame 38 is comprised of a net supporting ring portion 40 which may be of a generally circular or oval shape. A pair of longitudinal end supports 42 extend outwardly from net supporting ring 40 substantially parallel to each other and are connected by cross bar support 44. End supports 42 are bent downwardly at point 46 at approximately a 90° angle to form down turn legs 48. Frame 38 is preferably constructed of a rigid material such as aluminum to provide lightweight support to dip net 22.

Means 24 for receiving and retaining dip net 22 on plate 12 serves to position net 22 in relation to plate 12 so that frame 38 extends outwardly from plate 12. This allows hands off use of net 22 by the fisherman for netting a fish. Upon bending forward at the waist, it can be seen that net 22 will tilt forward and downward toward the water in response to the movement of the fisherman. After netting the fish, the fisherman then straightens up to bring net 22 out of the water. Rod 11 may then be placed in the socket of sleeve 30 for holding the rod so that the fisherman has both hands free for unhooking the fish and placing it on a stringer. Means 24 is comprised of tubular members 50 on plate 12 which are positioned on each side of ribs 26, as best seen in FIG. 3. Tubular members 50 are each provided with a longitudinal bore 52 illustrated in FIG. 1 which has a diameter slightly larger than the outer diameter of downturn legs 48 for frictionally receiving downturn legs 48 therein. Tubular members 50 are preferably constructed of aluminum and formed as an integral portion of plate 12 but may also be separate members formed of fiberglass or aluminum and fastened to plate 12 by glue, rivets or other conventional fastening means.

An alternate embodiment of dip net 22 and means 24 for receiving dip net 22 is illustrated in FIGS. 1 and 3. Optional tubular members 54, similar to tubular members 50 described above, are rigidly attached adjacent the top portion of ribs 26 with their longitudinal bores 56 facing outwardly from plate 12 and substantially perpendicular thereto. Frame 138 of alternate dip net 122 is modified so that end supports 142 extend straight outwardly from frame 138 and are not bent to form downturn legs 48. In this manner, the alternate embodiment of dip net 22 may be attached to and removed from plate 12 without the necessity of removing fishing rod 11 from sleeve 30. It should be understood that both embodiments of dip net 22 may also be used in the conventional hand held fashion by removing dip net 22 from plate 12 and grasping end supports 42 or 142 as a handle.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A fishing apparatus, comprising:
   a. an elongated base plate;
   b. means on said base plate for securing same at the waist of the wearer;
   c. means secured to said base plate for receiving and supporting a fishing rod;
   d. a dip net adapted to be secured to said base plate; and e. means attached to said base plate for receiving and supporting said dip net in a substantially horizontal position extending outwardly from the waist of the wearer, allowing hands free use of said dip net for netting a fish by the wearer bending at the waist to deflect said dip net toward the water.

2. The apparatus of claim 1 wherein said base plate is of a generally arcuate shape to conform to the wearer's waist.

3. The apparatus of claim 1 wherein said means for securing said base plate to the waist of the wearer comprises said base plate having slots at each end thereof for passage of a belt therethrough.

4. The apparatus of claim 1 wherein said means for receiving and supproting a fishing rod comprises a socket rotatably mounted on said base plate.

5. The apparatus of claim 1 wherein said dip net has a frame provided with at least two longitudinal end supports extending from said frame.

6. The apparatus of claim 5 wherein said means for receiving and supporting said dip net comprises at least two tubular members mounted on said base plate and adapted to receive said end supports on said dip net.

7. The apparatus of claim 1 further comprising means mounted on said base plate for receiving and securing bait containers.

8. A fishing apparatus, comprising:
 a. an elongated base plate having a generally arcuate shape to conform to the wearer's waist;
 b. said base plate having a slot at each end thereof, allowing passage of a belt therethrough for securing around the waist of the wearer;
 c. means secured to said base plate for receiving and supporting a fishing rod;
 d. a dip net adapted to be removably secured to said base plate; and
 e. means attached to said base plate for receiving and supporting said dip net in a substantially horizontal position extending outwardly from the waist of the wearer, allowing hands free use of said dip net for netting a fish by the wearer bending at the waist to deflect said dip net toward the water.

9. The apparatus of of claim 8 wherein said means for receiving and supporting a fishing rod comprises a socket rotatably mounted substantially at the center of said base plate and angled generally upwardly and away from the wearer.

10. The apparatus of claim 8 wherein said dip net has a frame provided with at least two longitudinal end supports extending from said frame.

11. The apparatus of claim 10 wherein said means for receiving and supporting said dip net comprises at least two tubular members mounted on said base plate and adapted to receive said end supports on said dip net.

12. The apparatus of claim 8, further comprising means mounted on said base plate for receiving and securing bait containers.

13. A fishing apparatus, comprising:
 a. an elongated base plate having a generally arcuate shape to conform to the wearer's waist;
 b. said base plate having a slot at each end thereof, allowing passage of a belt therethrough for securing around the waist of the wearer;
 c. a socket rotatably mounted substantially at the center of said base plate and angled generally upwardly and away from the wearer for receiving and supporting a fishing rod;
 d. a dip net adapted to be removably secured to said base plate;
 e. means attached to said base plate for receiving and supporting said dip net in a substantially horizontal position extending outwardly from the waist of the wearer, allowing hands free use of said dip net for netting a fish by the wearer bending at the waist to deflect said dip net toward the water.

14. The apparatus of claim 13 wherein said dip net has a frame provided with at least two longitudinal end supports extending from said frame.

15. The apparatus of claim 14 wherein said means for receiving and supporting said dip net comprises at least two tubular members mounted on said base plate and adapted to receive said end supports on said dip net.

16. The apparatus of claim 13, further comprising at least one flexible ring mounted on said base plate for receiving and securing bait containers therein.

17. The apparatus of claim 13, further comprising said base plate having at least one aperture adjacent a lower corner thereof for attaching a fish stringer to said base plate.

* * * * *